(12) United States Patent
Maxwell et al.

(10) Patent No.: US 11,909,745 B2
(45) Date of Patent: *Feb. 20, 2024

(54) SYSTEMS AND METHODS FOR ESTABLISHING SENDER-LEVEL TRUST IN COMMUNICATIONS USING SENDER-RECIPIENT PAIR DATA

(71) Applicant: Yahoo Assets LLC, Dulles, VA (US)

(72) Inventors: Lachlan A. Maxwell, Ashburn, VA (US); Donald J. Mcqueen, Leesburg, VA (US); Paul S. Rock, Leesburg, VA (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/937,563

(22) Filed: Oct. 3, 2022

(65) Prior Publication Data
US 2023/0029211 A1  Jan. 26, 2023

Related U.S. Application Data

(63) Continuation of application No. 17/183,787, filed on Feb. 24, 2021, now Pat. No. 11,503,041, which is a (Continued)

(51) Int. Cl.
*G06F 21/50* (2013.01)
*H04L 29/06* (2006.01)
(Continued)

(52) U.S. Cl.
CPC .............. *H04L 63/126* (2013.01); *G06F 7/08* (2013.01); *G06N 20/00* (2019.01); *H04L 63/0236* (2013.01)

(58) Field of Classification Search
CPC ..... H04L 63/14; H04L 63/12; H04L 63/0227; H04L 63/10; G06F 21/50
See application file for complete search history.

(56) References Cited

U.S. PATENT DOCUMENTS

| 2005/0021649 | A1* | 1/2005 | Goodman | ............. | H04L 51/212 |
| | | | | | 709/207 |
| 2007/0118904 | A1* | 5/2007 | Goodman | ............. | H04L 51/212 |
| | | | | | 726/22 |
| 2016/0014151 | A1* | 1/2016 | Prakash | .................. | H04L 47/62 |
| | | | | | 726/22 |

\* cited by examiner

*Primary Examiner* — Izunna Okeke
(74) *Attorney, Agent, or Firm* — Bookoff McAndrews, PLLC

(57) ABSTRACT

Systems and methods are disclosed for utilizing sender-recipient pair data to establish sender-level trust in future communication. One method comprises receiving raw communication data over a network and testing the received raw communication data against trained machine learning data to predict whether the raw communication data is associated with expected communication data. The raw communication data is sorted for expected communication data, which is further analyzed for sender-recipient pair data and assigned an expected communication pair data score. Senders associated with an expected communication pair data score that meets or exceeds a threshold are labeled and stored in a database as trusted. As a result of the sender-recipient pair analysis, recipients at-risk for being scammed can be identified, senders misidentified as spammers can be properly classified, and machine learning techniques utilized for analyzing raw communication data can be fine-tuned.

20 Claims, 7 Drawing Sheets

Related U.S. Application Data continuation of application No. 16/146,224, filed on Sep. 28, 2018, now Pat. No. 10,965,691.

(51) Int. Cl.
*H04L 9/40* (2022.01)
*G06F 7/08* (2006.01)
*G06N 20/00* (2019.01)

SYSTEMS AND METHODS FOR ESTABLISHING SENDER-LEVEL TRUST IN COMMUNICATIONS USING SENDER-RECIPIENT PAIR DATA

CROSS-REFERENCE TO RELATED APPLICATION(S)

This patent application is a continuation of and claims the benefit of priority to U.S. application Ser. No. 17/183,787, filed on Feb. 24, 2021, which is a continuation of and claims the benefit of U.S. application Ser. No. 16/146,224, filed Sep. 28, 2018, now U.S. Pat. No. 10,965,691, the entireties of which are incorporated herein by reference.

TECHNICAL FIELD

The present disclosure relates to evaluating and manipulating electronic communications for improving online user communications and, more particularly, to systems and methods for analyzing communication patterns between pairs of individuals and to establishing sender-level trust in communications using sender-recipient pair data.

BACKGROUND

Users of online communications platforms, such as e-mail, social media platforms, and other mobile applications, typically receive daily unsolicited communications (e.g. "spam") from malicious users, marketing companies, and sometimes other users. Some users are inundated with dozens or, sometimes, even hundreds or thousands of spam messages per day. Unfiltered spam (false negatives) can cause users to waste significant resources on sorting for desired communications. Conversely, filtered legitimate messages (false positives) can cause users to miss legitimate or even important messages from friends, family, or business associates. Previous spam-fighting methods lacked a way to take into account interpersonal relationships in a sufficiently dynamic or flexible way, leading to not-insignificant subsets of known false positives and false negatives in terms of email delivery to the inbox versus spam folder.

Accordingly, solutions are needed to be able to more accurately identify wanted communications. Thus, the present disclosure is directed to evaluating and manipulating electronic communications for improving online user communications and, more particularly, to systems and methods for analyzing communication patterns between pairs of individuals and to establishing sender-level trust in communications using sender-recipient pair data.

SUMMARY OF THE DISCLOSURE

Embodiments of the present disclosure include systems and methods for analyzing communication patterns between pairs of individuals and to establishing sender-level trust in communications using sender-recipient pair data.

According to certain embodiments, computer-implemented methods are disclosed for utilizing sender-recipient pair data to establish sender-level trust in future communications. One method includes receiving raw communication data between a sender and a recipient; testing the received raw data against trained machine learning data to predict whether the raw communication data may be associated with an expected communication; sorting the received raw data for expected communication data; analyzing the expected communication data for known sender and recipient communication pair data, communication delivery data, feedback data and interaction data, in order to generate an expected communication pair data score; evaluating the expected communication pair data score against a threshold and labeling the expected communication data with an expected communication pair data score exceeding the threshold, as trusted; updating the trained machine learning data with a list of sender and recipient communication pair data corresponding to the expected communication pair data score that was determined to be trusted; generating communication data filters based on the updated trained machine learning data; and filter future expected communication data against the communication data filters in order to screen for trusted expected communication data.

According to certain embodiments, systems are disclosed for utilizing sender-recipient pair data to establish sender-level trust in future communications. One system includes at least one data storage device and processor configured to execute instructions for: receiving raw communication data between a sender and a recipient; testing the received raw data against trained machine learning data to predict whether the raw communication data is associated with an expected communication; sorting the received raw data for expected communication data; analyzing the expected communication data for known sender and recipient communication pair data, communication delivery data, feedback data and interaction data, in order to generate an expected communication pair data score; evaluating the expected communication pair data score against a threshold and labeling the expected communication data with an expected communication pair data score exceeding the threshold, as trusted; updating the trained machine learning data with a list of sender and recipient communication pair data corresponding to the expected communication pair data score that was determined to be trusted; generating communication data filters based on the updated trained machine learning data; and filter future expected communication data against the communication data filters in order to screen for trusted expected communication data.

According to certain embodiments, a non-transitory computer readable medium is disclosed for utilizing sender-recipient pair data to establish sender-level trust in future communications. At least one non-transitory computer readable medium stores instructions, that when executed by a processor, cause the processor to execute the instructions for: receiving raw communication data between a sender and a recipient; testing the received raw data against trained machine learning data to predict whether the raw communication data is associated with an expected communication; sorting the received raw data for expected communication data; analyzing the expected communication data for known sender and recipient communication pair data, communication delivery data, feedback data and interaction data, in order to generate an expected communication pair data score; evaluating the expected communication pair data score against a threshold and labeling the expected communication data with an expected communication pair data score exceeding the threshold, as trusted; updating the trained machine learning data with a list of sender and recipient communication pair data corresponding to the expected communication pair data score that was determined to be trusted; generating communication data filters based on the updated trained machine learning data; and filter future expected communication data against the communication data filters in order to screen for trusted expected communication data.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
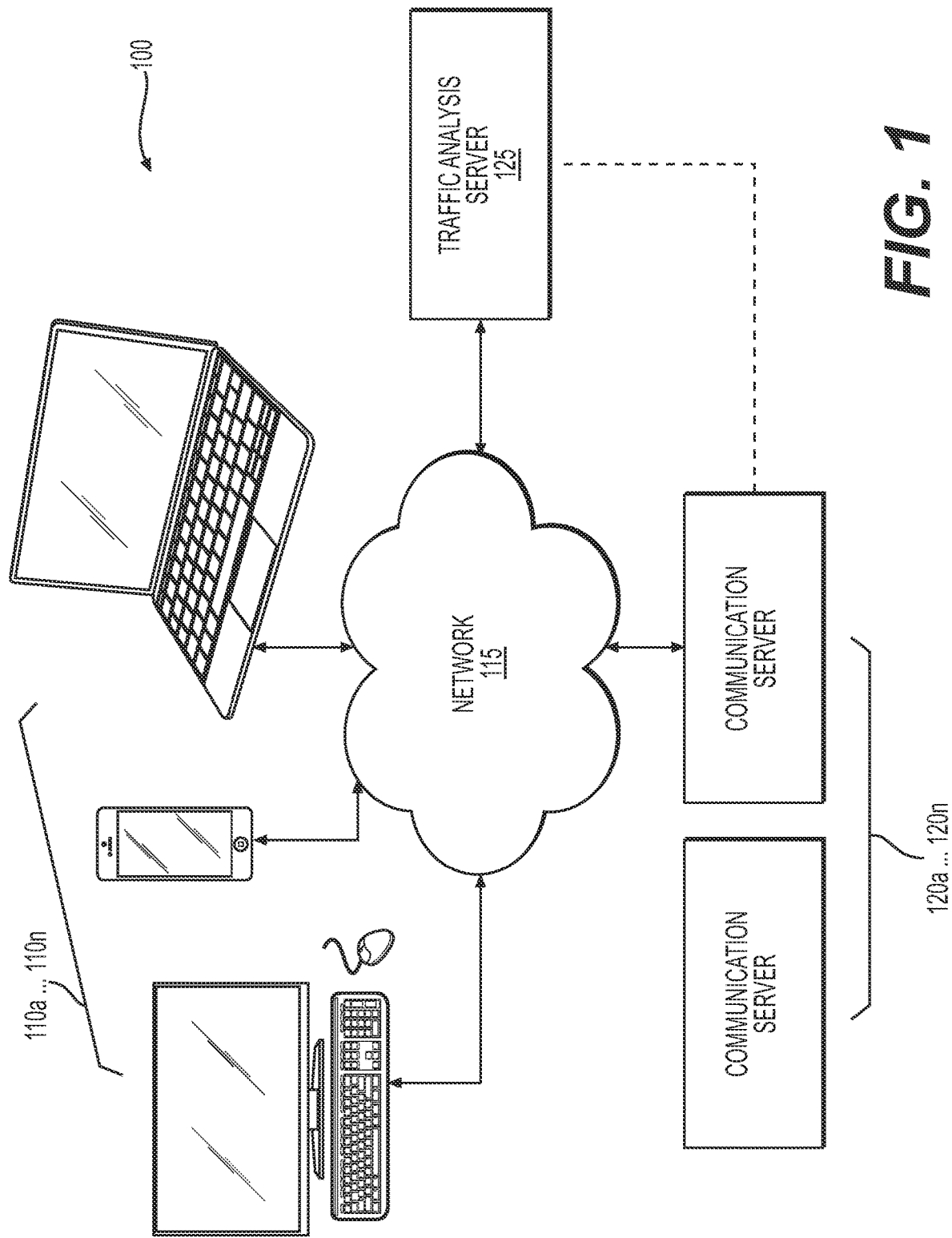
FIG. 1 depicts a schematic diagram of an exemplary network environment 100 for analyzing communication patterns between pairs of individuals and establishing sender-level trust in communications using sender-recipient pair data, according to an exemplary embodiment of the present disclosure.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of system and method for utilizing sender-recipient pair data to establish sender-level trust in future communications.

As described above, there is a need in the field of electronic communications to know if communication between two people is mutually desired, or at the very least, expected (e.g. a relationship of some kind existed). Currently, anti-spam infrastructure does not offer such insight, but the existence of such relationships may be a strong indicator of both spam and not-spam. Namely, if enough users have positive relationships with a given email sender, it is reasonably safe to assume that future users tend to feel the same way, and the inverse may be true as well. The absence of relationships may tend in the direction of spam. In order to understand and map users' relationships, it can be important to track sender-recipient pairs over time, and use that data as a reference for desired, expected and unexpected exchanges. This may involve tracking events, such as email sends, reads, deletes, user feedback about spam vs. not-spam, etc. for each pair. It may then be possible to analyze the raw data and determine the best way to define and capture the relationships to fight spam.

In one embodiment, as an initial step, one or more network-connected computing systems may be used to intercept or monitor "raw" communications data between users of the electronic messaging platform. This raw data may be collected at the sender-recipient pair level, along with associated information about the flow of conversations between each pair of individuals. This raw data may then be filtered using derived criteria that predict whether each interaction was expected or not, and only expected interactions may be kept. Sender-recipient pairs that show expected communication in both directions (i.e., between both the sender and recipient) may be set aside. Using expected pairs involving recipients on a list of known-real/trusted users (if available, else all expected pairs are used), conversation flow information may be analyzed and a list of senders whose communications are generally well received, but who have a disproportionate amount of their interactions labeled negatively by the existing monitoring may be identified. All pairs involved with these senders may be labeled at-risk, and merged with the bi-directional communicating pairs from above.

Filters may then be made based on those pairs to protect communications (e.g., e-mail, chat messages, etc.), both at the pair-level and the sender-level, using derived quality control metrics to check the lists. Any pairs ever protected by the pair-level filter may be set aside and merged back into future filters, to ensure specific protection continues even if pairs from a given sender cease to be labeled at-risk in the future. A similar method to the one above may be executed for senders whose communications are generally poorly received, but who have a disproportionate amount of their interactions labeled positively by existing monitoring. One notable difference here in this process is that the bi-directional communications may be omitted, as they prevailingly score positive.

FIG. 1 depicts a schematic diagram of an exemplary network environment 100 for analyzing communication patterns between pairs of individuals and establishing sender-level trust in communications using sender-recipient pair data, according to an exemplary embodiment of the present disclosure. As shown in FIG. 1, the environment 100 may include at least one network device 110a-n, an electronic network 115, at least one communications server 120a-n, and at least one traffic analysis server 125. Network devices 110a-n may include laptop and desktop computers, Internet-enabled mobile devices, or any Internet-enabled device. Electronic network 115 may be, for example, the Internet, but may also be or comprise a Local Area Network (LAN), Wide Area Network (WAN), Wireless Local Area Network (WLAN), Metropolitan Area Network (MAN), and/or Storage Area Network (SAN), etc. A website (or a communication application) may be hosted by a communications server 120 so that it is made accessible to one or more of network devices 110a-n.

The communications server 120, which may be an e-mail server, a mobile application server, a web server, or a content delivery network (CDN), may be configured to monitor and/or intercept "raw" communications data between users of the electronic messaging platform across network devices 110. The traffic analysis server 125 may analyze network traffic exchanged between network devices 110*a-n* and communications servers 120*a-n* in accordance with techniques presented herein. Although the traffic analysis server 125 is depicted as separate from the communications servers 120*a-n*, in some embodiments, the functions performed by the traffic analysis server 125 may be performed on a communications server 120. Further, steps of the methods depicted in FIGS. 3-7 may be practiced on a combination of devices depicted in FIG. 1.

Figure 2:
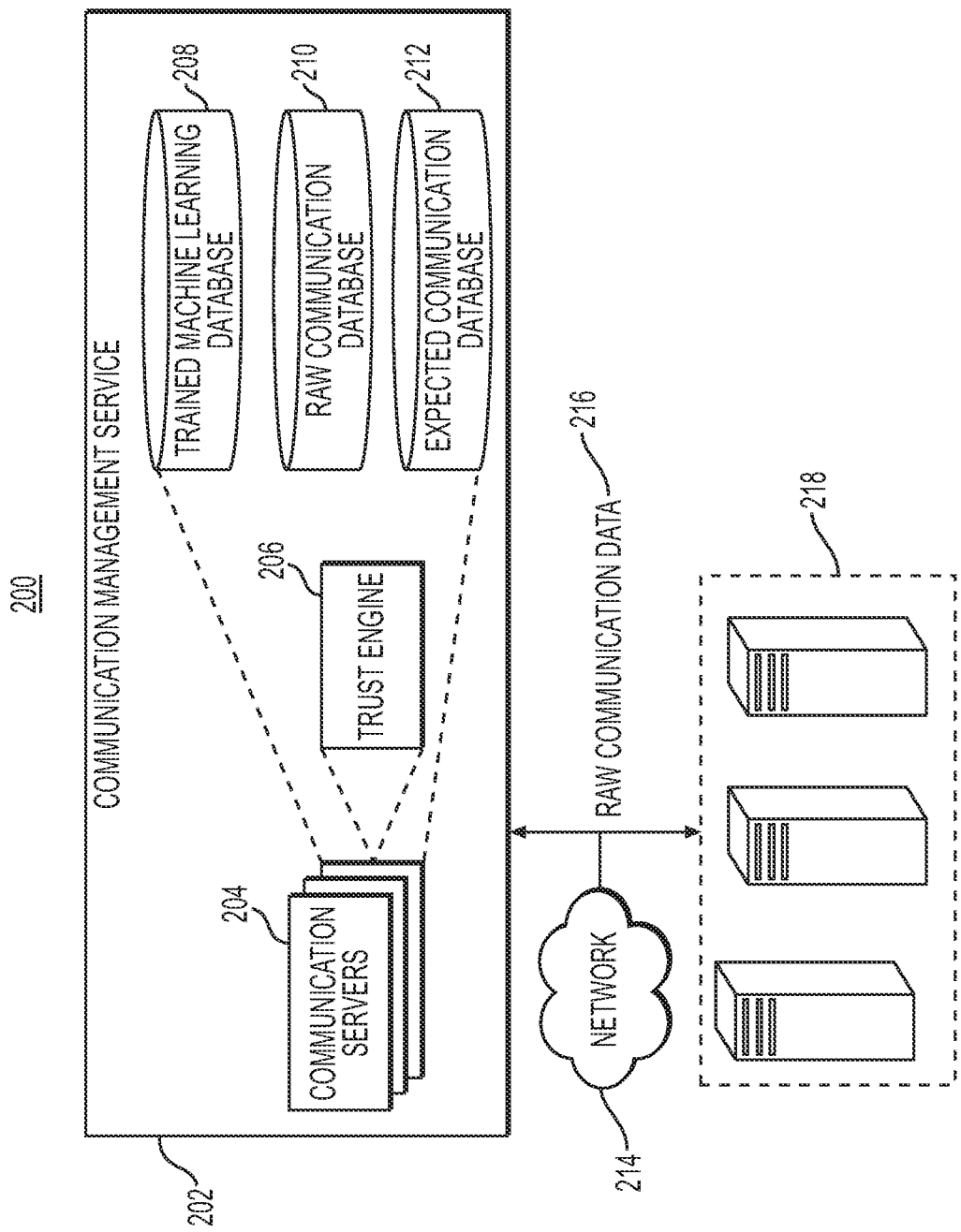
FIG. 2 depicts a schematic diagram of a computing system for analyzing communication patterns between pairs of individuals and establishing sender-level trust in communications using sender-recipient pair data.

FIG. 2 depicts a schematic diagram of a computing system 200 for analyzing communication patterns between pairs of individuals and establishing sender-level trust in communications using sender-recipient pair data. In general, computing system 200 comprises a communication management service 202 and a plurality of networked devices 218 communicating over network 214, such as the Internet. Communication management service 202 comprises a plurality of communication servers 204, a trust engine 206, a trained machine learning database 208, a raw communications database 210, and an expected communications database 212. Networked devices 218 may comprise user devices or any type of networked communications devices, including web servers, mobile application servers, or even communication servers 204.

As shown in the embodiment of FIG. 2, raw communication data 216 may be collected by the communication management service 202 over a network 214 from monitoring and/or intercepting communications exchanged between and among networked devices 218. The communication management service 202 may operate one or more communication servers 204 to aid in processing the received raw communication data 216 from the networked devices 218. The one or more communication servers 204 may house or be disposed in communication with trust engine 206, as well as trained machine learning database 208, raw communication database 210, and expected communication database 212. Raw communication data 216 may include sender-recipient pair level data, delivery/deposit information, and user interaction data (e.g., user feedback about delivery). The networked devices 218 may include laptop and desktop computers, Internet-enabled mobile devices and accessories (e.g. watches), or any Internet-enabled device. The electronic network 214 may be, for example, the Internet, but may also be or comprise a Local Area Network (LAN), Wide Area Network (WAN), Wireless Local Area Network (WLAN), Metropolitan Area Network (MAN), and/or Storage Area Network (SAN), etc.

In one embodiment, system 200 for utilizing sender-recipient pair data to establish sender-level trust in future communications may implement machine learning techniques, such as:
  Supervised learning
  Unsupervised learning
  Reinforcement learning
  Semi-supervised learning The system 200 for utilizing sender-recipient pair data to establish sender-level trust in future communications may implement one or more of the following algorithms, including but not limited to:
  Regression:
  Ordinary Least Squares Regression (OLSR)
  Linear Regression
  Logistic Regression
  Stepwise Regression
  Multivariate Adaptive Regression Splines (MARS)
  Locally Estimated Scatterplot Smoothing (LOESS)
  Instance-based:
  k-Nearest Neighbor (kNN)
  Learning Vector Quantization (LVQ)
  Self-Organizing Map (SOM)
  Locally Weighted Learning (LWL)
  Regularization:
  Ridge Regression
  Least Absolute Shrinkage and Selection Operator (LASSO)
  Elastic Net
  Least-Angle Regression (LARS)
  Decision Tree:
  Random Forest
  Classification and Regression Tree (CART)
  Iterative Dichotomiser 3 (ID3)
  C4.5 and C5.0
  Chi-squared Automatic Interaction Detection (CHAID)
  Decision Stump
  M5
  Conditional Decision Trees
  Bayesian:
  Naive Bayes
  Gaussian Naive Bayes
  Multinomial Naive Bayes
  Averaged One-Dependence Estimators (AODE)
  Bayesian Belief Network (BBN)
  Bayesian Network (BN)
  Clustering:
  k-Means
  k-Medians
  Expectation Maximization (EM)
  Hierarchical Clustering
  Association Rule Learning:
  Apriori algorithm
  Eclat algorithm
  Deep Learning Algorithms:
  Deep Boltzmann Machine (DBM)
  Deep Belief Networks (DBN)
  Convolutional Neural Network (CNN)
  Stacked Auto-Encoders
  Dimensionality Reduction Algorithms:
  Principal Component Analysis (PCA)
  Principal Component Regression (PCR)
  Partial Least Squares Regression (PLSR)
  Sammon Mapping
  Multidimensional Scaling (MDS)
  Projection Pursuit
  Linear Discriminant Analysis (LDA)
  Mixture Discriminant Analysis (MDA)
  Quadratic Discriminant Analysis (QDA)
  Flexible Discriminant Analysis (FDA)
  Ensemble:
  Boosting
  Bootstrapped Aggregation (Bagging)
  AdaBoost
  Stacked Generalization (blending)
  Gradient Boosting Machines (GBM)
  Gradient Boosted Regression Trees (GBRT)

Machine learning models may be fine-tuned based on updates made to the data stored in the trained machine learning database 208.

Figure 3:
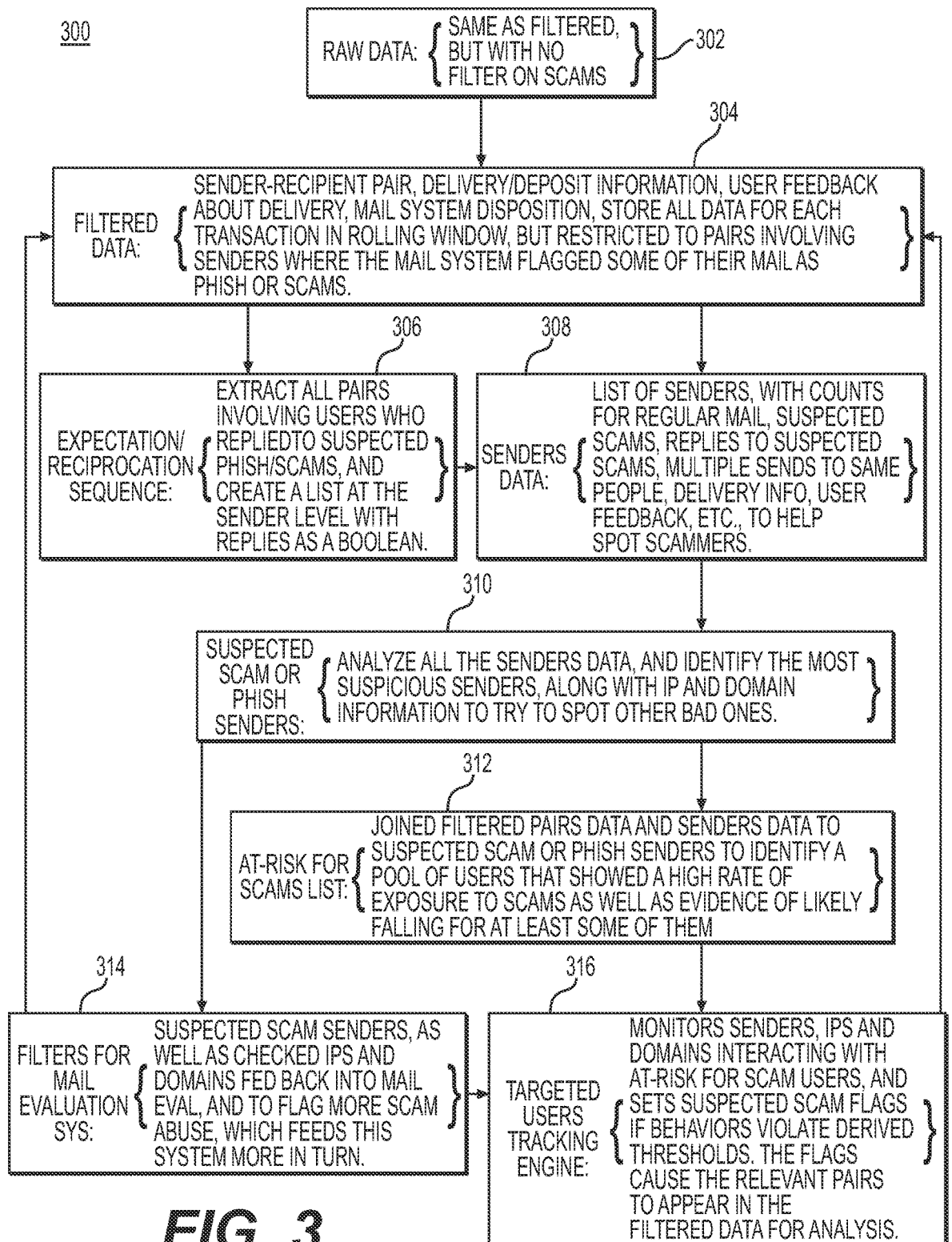
FIG. 3 depicts a block diagram of an exemplary method of analyzing communication patterns between pairs of individuals and establishing sender-level trust in communications using sender-recipient pair data.

FIG. 3 depicts a block diagram of an exemplary method 300 of utilizing sender-recipient pair data to establish sender-level trust in future communications. In one embodiment, raw data may be received at one or more communications servers 120*a-n* and then filtered (Step 302). As shown, the raw data may be the same as or similar to unfiltered data but with no filter on potential scams or spam. The raw data may then be filtered for information pertaining to at least sender-recipient pair level data, delivery/deposit information, user feedback information regarding delivery, communication system (e.g. mail system) disposition, and the aforementioned filtered data may be stored in the communications server (Step 304). The filtered data may then be further processed in an expectation/reciprocation analysis to extract information pertaining to whether the communication was expected by the recipient. Here, sender-recipient pairs involving users who replied to the suspected negative communication(s) (e.g., phishing scams, fraudulent scams, etc.) may be placed in a list for expected sender-recipient pairs with replies as a Boolean operation (e.g., true or false) (Step 306). This list for expected sender-recipient pairs may be used to identify a list of senders that are suspected of scams (i.e., untrusted), transmit multiple communications (i.e., wherein the number of communications meets or exceeds an acceptable threshold) to recipients in a short period of time (e.g., a minute, an hour(s), a day, etc.), or are perceived to be responsible for negative/unwanted communication based on user feedback (Step 308).

The list of senders that are suspected of being associated with spam or scams may be analyzed to identify various sender data, for example, IP addresses associated with sender devices, domain information, communication usernames, GPS coordinates associated with the sender's device and sender contact list(s) (e.g., friends/followers list or address book) (Step 310); furthermore, user(s) and user devices(s) may be assigned unique identifiers to aid in tracking senders and recipients. Creating a security profile (or list) identifying both hostile (i.e., unwanted communications) and potentially hostile operations may be generated and/or utilized. The list of senders suspected of scams may be used to identify recipients that are at-risk for being scammed. Here, a recipient list may be generated, which is comprised of users who have shown a high rate of exposure to negative communication (i.e., scams, fraud, etc.) as well as evidence of becoming a victim of at least one scam or fraud (Step 312). The list of senders suspected of being associated with spam and/or scams may also be cataloged in one or more communications servers 120*a-n* (Step 312) and used in filtering future communication for scams, fraud, and abuse. (Step 314). The aforementioned filters may further be used to generate criteria to evaluate raw and filtered data for instances in which activity meets or exceeds one or more thresholds (e.g., a threshold representing an upper limit and/or a threshold representing a lower limit) (Step 316). The traffic analysis server 125 may monitor raw data and filtered data for senders, IP addresses, and domains that interact with recipients on the at-risk list and if certain behavior may be flagged for violating derived thresholds, the sender-recipient pairs and their associated involved with that activity and their associated data are flagged for analysis (Step 316).

Additional information that may be analyzed from the raw data may comprise browsing and other website interaction data, and/or electronic messaging data. The basic data types received may be referred to as variables, such as sender and/or destination Internet Protocol (IP) addresses, dates associated with the traffic, usernames or other user identifiers, sender information and/or sender identifiers, read or ignored data, success/failure to authenticate information, dated/timestamped user-action/event pairs, whether electronic messages were read or ignored, geographic information of the Internet Protocol (IP) address or other identifiers, device information such as computer make, model, type, and/or specifications, user demographic information, browsing history, web cookie data, and browser or other device and/or software identifiers. At step 304, data may be cross-checked for overlap with other features that predict humanness. For example, it may be noted if the sender is associated with a trusted IP address. Other features may include if the user shows a humanlike pattern of logins. For example, it may be considered if a sender logs in consistently from an IP address that is probably a home, logs in from an IP address that is probably an office, logs in occasionally from diverse IP addresses like at a coffee shop, and/or logs in infrequently but consistently from another private residence. If the user always uses a small set of devices (device profiles), that may also further support the sender being considered human. If the user follows a consistent and/or sensible geo-profile, that may support the sender being considered human. Whether the user has a believable address book may also be considered, and may be considered both independently and in the context of interactions with recipients.

Other features could also be joined as external sources. For example, it may be considered by the system whether the user confirmed a non-VOIP or other mobile number via text message. The system may determine whether the user pays for features. The system may also determine if confirmation information, for example, a confirmation phone number, is used by more than a predetermined number of additional accounts (too many may indicate non-human behavior). These external sources of information may serve as a reference to fine tune the system to identify senders that are suspected of scams more accurately.

Figure 4:
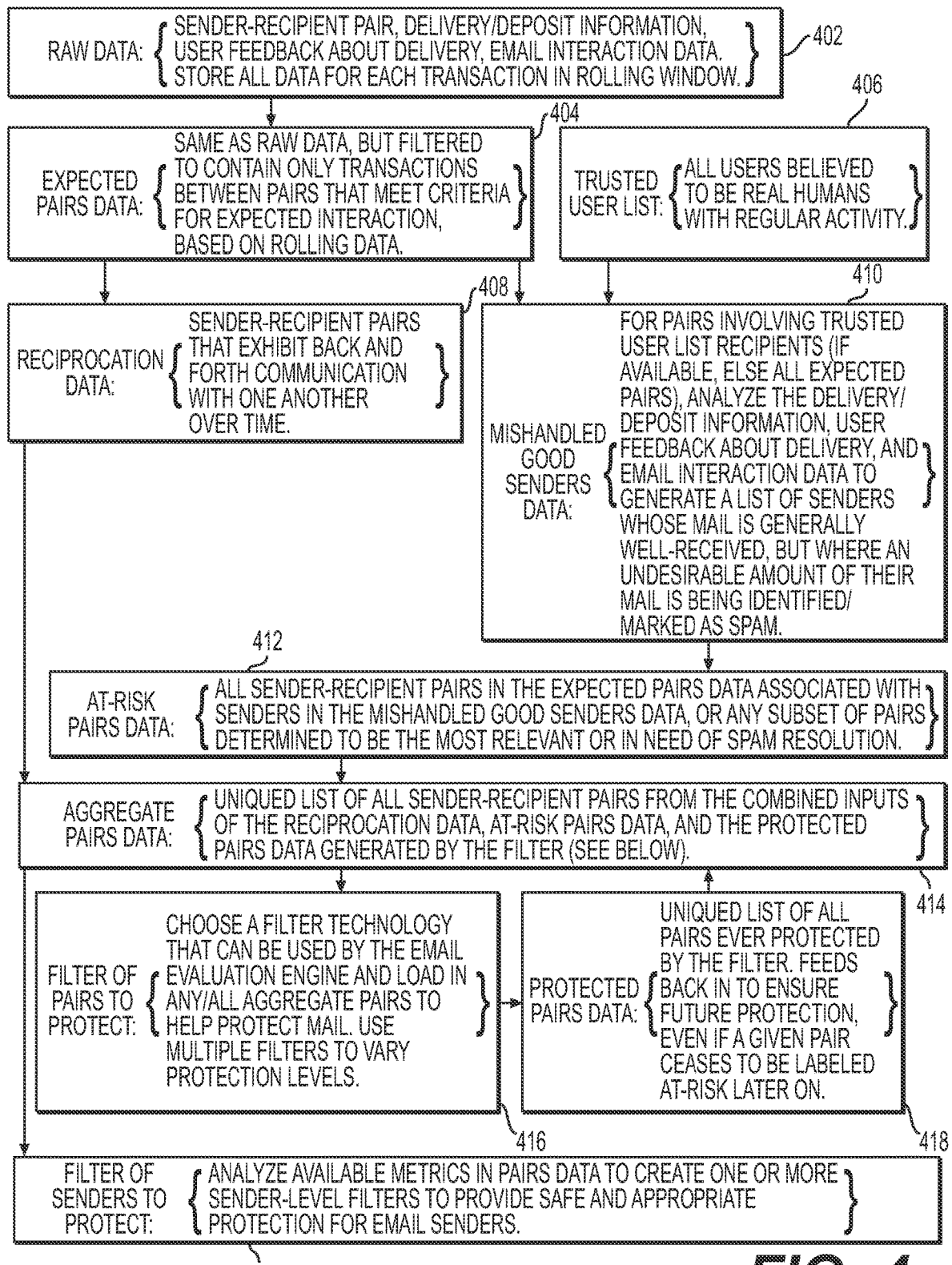
FIG. 4 depicts a block diagram of an exemplary alternative method of analyzing communication patterns between pairs of individuals and establishing sender-level trust in communications using sender-recipient pair data.

FIG. 4 depicts a block diagram of an exemplary alternative method 400 of utilizing sender-recipient pair data to establish sender-level trust in future communications. As shown in FIG. 4, in one embodiment, raw data may be received at one or more communications servers 120*a-n* and aggregated to be filtered (Step 402). The filtered raw data may be analyzed and filtered for expected pairs data, which are sender-recipient pairs derived from raw data that meet criteria for expected interaction (Step 404). In addition to the expected pairs data, the communications servers 120*a-n* may maintain a trusted user list of all users that are perceived to be real users (as opposed to bots) with regular activity (Step 406). Reciprocation data may be further filtered from the expected pairs data, which indicates users who are engaged in back and forth communication over time (Step 408). The expected pairs data and trusted users list may be further analyzed in order to identify mishandled good senders data (Step 410). Here, expected pairs data and trusted user list may be analyzed at least for delivery/deposit information, user (i.e., recipient) feedback information about delivery (e.g., moving the communication from the spam folder to the inbox folder), and email interaction data to generate a list of senders whose communication is generally well-received, but also have an undesirable amount of communication being identified/classified as negative communication (i.e., spam, fraud, or scams) (Step 410). Sender-recipient pairs associated with senders in the mishandled good senders data, or any subset of pairs determined to be most relevant or in need of protection may be further classified as at-risk pairs data (Step 412). A list of sender-recipient pairs from the combined inputs of the reciprocation data, at-risk pairs data, and the protected pairs data may be generated by applying filters to the aforementioned data (Step 414). Filters may be either chosen or generated by the communication evaluation engine and applied to all aggregate pairs data to protect communication (Step 416). The filtered protected pairs data may be fed back in to the aggregated pairs data list to ensure future protection of protected pairs data and further ensure that such pairs cease to be labeled as at-risk (Step 418). The aggregate pairs data may also be analyzed, in view of available metrics, in order to generate one or more sender-level filters to further generate a list of senders to protect (Step 420).

Figure 5:
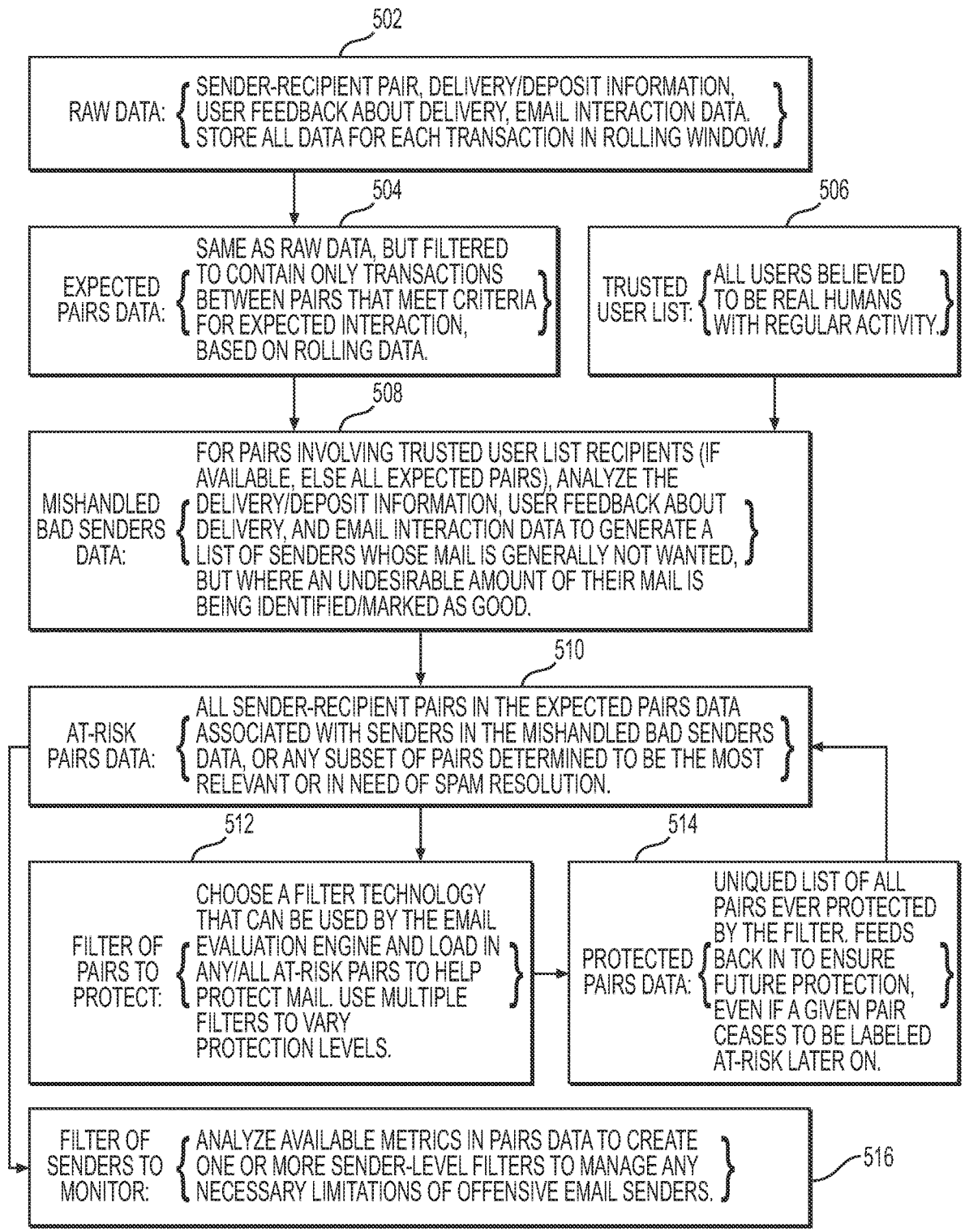
FIG. 5 depicts a block diagram of an exemplary alternative method of analyzing communication patterns between pairs of individuals and establishing sender-level trust in communications using sender-recipient pair data

FIG. 5 depicts a block diagram of an exemplary alternative method 500 of utilizing sender-recipient pair data to establish sender-level trust in future communications. As shown in FIG. 5, in one embodiment, raw data may be received at one or more communications servers 120*a*-*n* and aggregated to be filtered (Step 502). The filtered raw data may be analyzed and filtered for expected pairs data, which are sender-recipient pairs derived from raw data that meet criteria for expected interaction (Step 504). In addition to the expected pairs data, one or more communications servers 120*a*-*n* may maintain a trusted user list of all users that are perceived to be real users (as opposed to bots) with regular activity (Step 506). The expected pairs data and trusted user list are further analyzed in order to identify mishandled good senders data (Step 508). Here, expected pairs data and trusted user lists may be analyzed at least for delivery/deposit information, user feedback information about delivery, and email interaction data to generate a list of senders whose communication is generally well-received, but who also have an undesirable amount of communication being identified/classified as negative communication (i.e., spam, fraud, or scams) (Step 508). Sender-recipient pairs associated with senders in the mishandled good senders data, or any subset of pairs determined to be most relevant or in need of protection are further classified as at-risk pairs data (Step 510). Filters are either chosen or generated by the communication evaluation engine and applied to all at-risk pairs data to protect communication (Step 512). The filtered protected pairs data is fed back in to the at-risk pairs data list to ensure future protection of protected pairs data and further ensure that such pairs cease to be labeled as at-risk (Step 514). The at-risk pairs data may also be analyzed, in view of available metrics, in order to generate one or more sender-level filters to further generate a list of senders to protect (Step 516).

Figure 6:
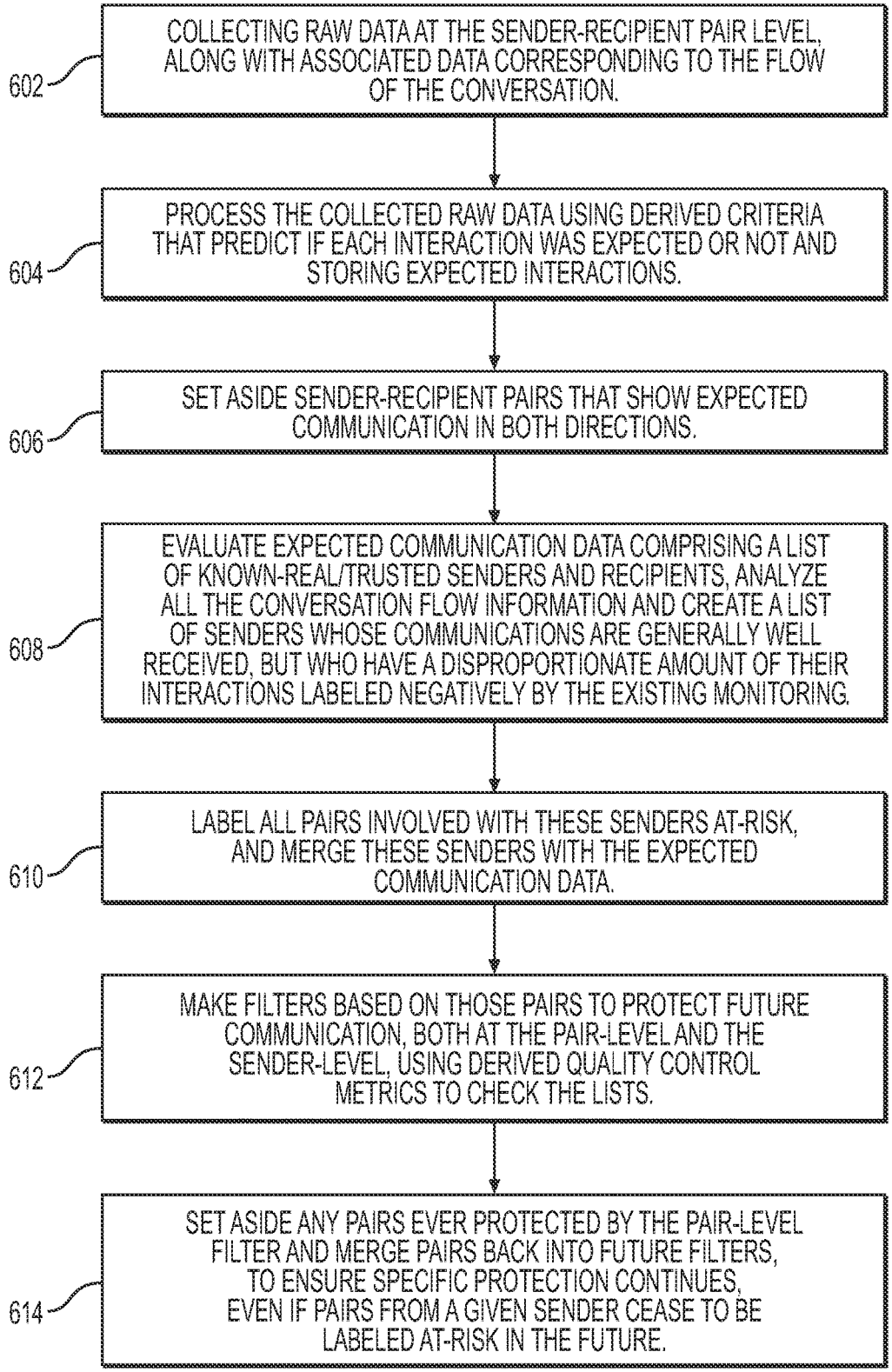
FIG. 6 depicts a flow diagram of an exemplary method 600 of analyzing communication patterns between pairs of individuals and establishing sender-level trust in communications using sender-recipient pair data.

FIG. 6 depicts a flow diagram of an exemplary method 600 of utilizing sender-recipient pair data to establish sender-level trust in future communications. As shown in FIG. 6, method 600 comprises a step in which raw data may be collected at the sender-recipient pair level, along with associated data corresponding to the flow of the conversation (Step 602). For example, raw communication data 216 may be collected by the communication management service 202 over the network 214 from user devices 218. The trust engine 206 may then analyze the received raw communication data 216 against pre-established criteria to filter out sender-recipient pair level data, which may be used to further predict whether communication between the users associated with the sender-recipient pair level data was expected or not (Step 604). Post-analysis, only sender-recipient pair level data associated with expected communications may be stored in the expected communication database 212 (Step 606). The sender-recipient pair level data stored in the expected communication database 212 may be further analyzed by the trust engine 206 for known-trusted users by evaluating the sender-recipient pair level data for conversation flow information (e.g. content parsing and/or semantic analysis), which is indicative of whether the communication transmitted to the recipient was well received (i.e., designated as a positive interaction by the trust engine 206) (Step 608).

In one embodiment, the trust engine 206 may create a list of senders whose communications are generally well received. The trust engine 206 may also create a list of senders whose communications are well received, but also have a disproportionate amount of their communications labeled negatively; these senders continue to be labeled as mishandled good senders/known-trusted users. However, all sender-recipient pair data associated with these senders may be labeled as at-risk. The trust engine 206 may additionally create a list of senders whose communication is poorly received, but have a disproportionate amount of their communications labeled as positive. The trust engine 206 may then merge the aforementioned lists and store the lists in the expected communication data database 212 (Step 610). The trust engine 206 may further leverage machine learning to generate filters (e.g., in real-time) and/or utilize pre-determined filters (Step 612) to train machine learning algorithms to protect future expected communication data, which meet a set of criteria (which may be derived in real-time or may be predetermined). Such data may therefore be classified as expected sender-recipient pairs or know-trusted users (Step 614). The results of all machine learning analysis may be stored in the trained machine learning database 208 and utilized to further train machine learning algorithms and to ensure that expected sender-recipient pairs or know-trusted users remain as a protected class upon receipt of future raw communication data 216 (Step 614).

Figure 7:
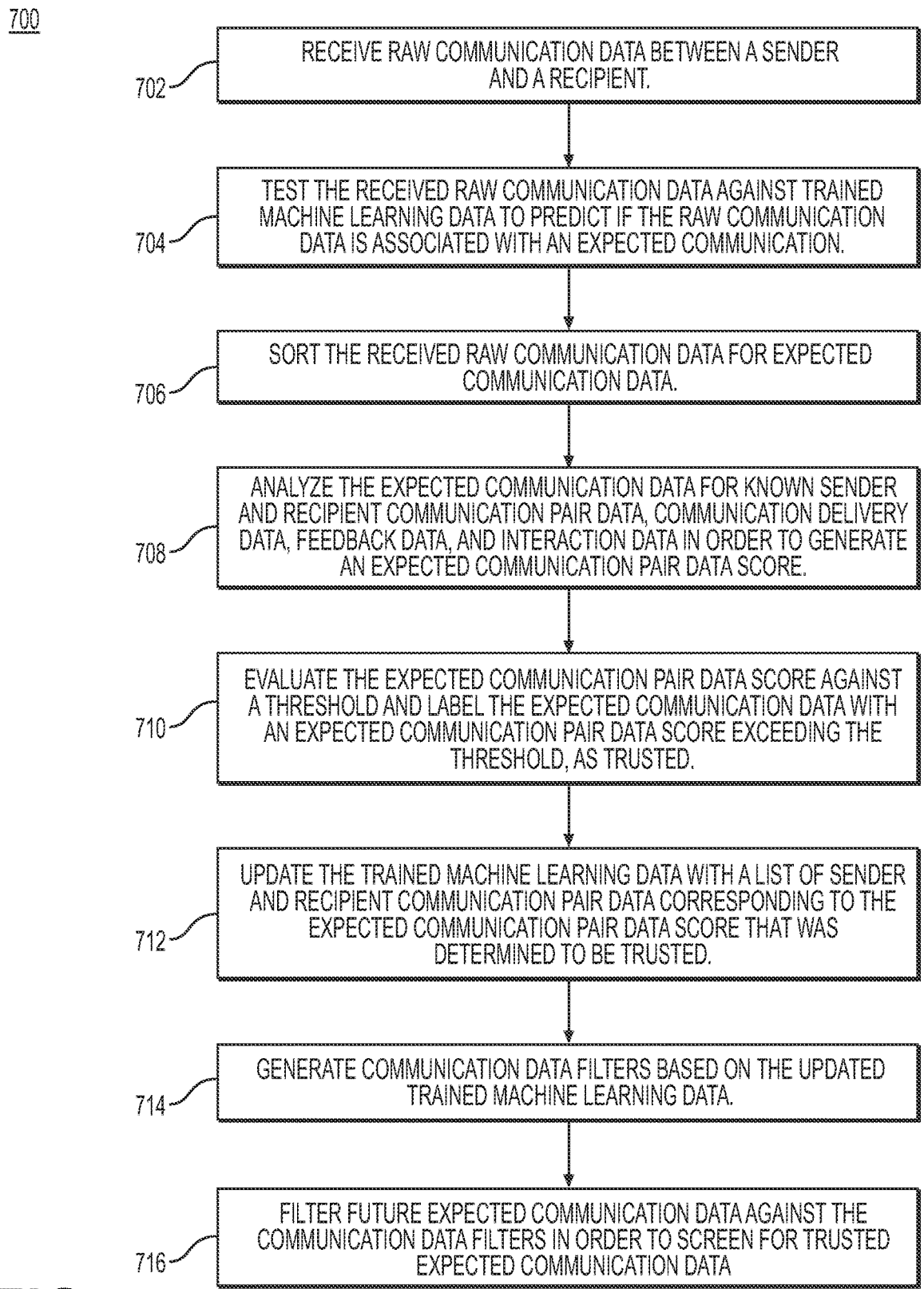
FIG. 7 depicts a flow diagram of an alternative exemplary method 700 of analyzing communication patterns between pairs of individuals and establishing sender-level trust in communications using sender-recipient pair data.

FIG. 7 depicts a flow diagram of an alternative exemplary method for utilizing sender-recipient pair data to establish sender-level trust in future communications. As shown in FIG. 7, method 700 comprises a step in which raw data may be collected at the sender-recipient pair level, along with associated data corresponding to the flow of the conversation (Step 702). For example, raw communication data 216 may be collected by the communication management service 202 over the network 214 from user devices 218. The received raw communication data may then be tested against trained machine learning data to predict whether the raw communication data may be associated with an expected communication (Step 704). Here, testing may comprise one or more computer-implemented processes of applying filters to the raw communication data, running experiments, etc., which results in the raw communication data being sorted for expected communication data (Step 706). The expected communication data may then be analyzed for sender and recipient pair data, communication delivery data, feedback data, and interaction data in order to generate an expected communication pair data score (Step 708). The expected communication pair data score may be further evaluated against a threshold, wherein expected communication pair data with a score exceeding a threshold may be labeled as trusted (Step 710). The trained machine learning data may then be updated with a list of sender and recipient communication pair data corresponding to the expected communication pair data with scores that exceed the threshold and may be determined to be trusted (Step 712). Various data may be scored by any computer-implemented method combination of assigning data a number on a scale (e.g. a number between 0 and 100), ranking data, and weighting some data and its associated score more heavily. Communication data filters may then be generated based on the updated trained machine learning data (Step 714). The generated communication data filters may then be utilized to filter future communication data and to further screen for trusted expected communication data (Step 716).

The aforementioned systems and methods may be implemented via any suitable system infrastructure. The following discussion provides a brief, general description of a suitable computing environment in which the present disclosure may be implemented. Although not illustrated, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers (e.g. smart watches, smart jewelry, smart medical devices, smart medical aids), all manner of cellular or mobile phones (including Voice over IP ("VoIP") phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor. However, some machine learning, deep learning and neural network environments may require more robust processing units; for example, an Application Specific Integrated Circuit (ASIC) Tensor Processing Unit (TPU) which may be assembled with 16 GB of high bandwidth memory and may be capable of delivering over 180 teraflop performance; or a Graphics Processing Unit (GPU). Some or all of the database(s) described herein, may comprise a cache, a buffer, a relational database, an active database, a matrix, a self-referential database, a table, a non-relational No-SQL system, an array, a flat file, a documented-oriented storage system, and the like.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. In a distributed computing environment, program modules may be located in both local and remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the disclosure being indicated by the following claims.

The invention claimed is:

1. A computer-implemented method for establishing sender-level trust in future electronic communication, comprising:
   receiving, over a network at a server, communication data between a sender and a recipient;
   determining, using a trained machine learning database, whether the received communication data is associated with an expected communication and an expected communication pair data score;
   labeling the expected communication pair data score and the sender associated with the expected communication pair data score as trusted based on a determination that the expected communication pair data score meets or exceeds a threshold; and
   updating the trained machine learning database with sender and recipient communication pair data corresponding to the trusted expected communication pair data score for future communication.

2. The computer-implemented method of claim 1, further comprising:
   screening for trusted expected communication data by filtering future expected communication data against the communication data filters.

3. The computer-implemented method of claim 1, further comprising:
   generating a list of untrusted senders associated with an expected communication pair data score that does not meet or exceed the threshold.

4. The computer-implemented method of claim 3, further comprising:
   analyzing the list of untrusted senders for various identifying data unique to the sender; and
   storing the list of untrusted senders in the trained machine learning database.

5. The computer-implemented method of claim 1, wherein generating an expected communication pair data score based on the expected communication data comprises:
   analyzing the expected communication data for known sender and recipient communication pair data, communication delivery data, feedback data, and interaction data, wherein the interaction data comprises at least information corresponding to whether the recipient replied to the sender.

6. The computer-implemented method of claim 4, further comprising:
   determining whether the communication transmitted by the senders corresponding with the list of untrusted senders was well-received by the recipient, by analyzing recipient feedback information.

7. The computer implemented method of claim 4, further comprising:
   identifying recipients that are at risk of being communicated by untrusted senders by analyzing the list of untrusted senders for sender recipient pair data.

8. A system for establishing sender-level trust in future electronic communication, the system including a computing processor configured to execute instructions to perform a method including:
   receiving, over a network at a server, communication data between a sender and a recipient;
   determining, using a trained machine learning database, whether the received communication data is associated with an expected communication and an expected communication pair data score;
   labeling the expected communication pair data score and the sender associated with the expected communication pair data score as trusted based on a determination that the expected communication pair data score meets or exceeds a threshold; and
   updating the trained machine learning database with sender and recipient communication pair data corresponding to the trusted expected communication pair data score for future communication.

9. The system of claim 8, wherein the method further includes:
   screening for trusted expected communication data by filtering future expected communication data against the communication data filters.

10. The system of claim 8, wherein the method further includes:
    generating a list of untrusted senders associated with an expected communication pair data score that does not meet or exceed the threshold.

11. The system of claim 10, wherein the method further includes:
    analyzing the list of untrusted senders various identifying data unique to the sender; and
    storing the list of untrusted senders in the trained machine learning database.

12. The system of claim 8, wherein generating an expected communication pair data score based on the expected communication data comprises:
    analyzing the expected communication data for known sender and recipient communication pair data, communication delivery data, feedback data, and interaction data, wherein the interaction data comprises at least information corresponding to whether the recipient replied to the sender.

13. The system of claim 11, wherein the method further includes:
    determining whether the communication transmitted by the senders corresponding with the list of untrusted senders was well-received by the recipient, by analyzing recipient feedback information.

14. The system of claim 11, wherein the method further includes:
    identifying recipients that are at risk of being communicated by untrusted senders by analyzing the list of untrusted senders for sender recipient pair data.

15. A non-transitory computer-readable medium storing instructions that, when executed by a computer, cause the computer to perform a method for establishing sender-level trust in future electronic communication, the method including:
    receiving, over a network at a server, communication data between a sender and a recipient;
    determining, using a trained machine learning database, whether the received communication data is associated with an expected communication and an expected communication pair data score;

labeling the expected communication pair data score and the sender associated with the expected communication pair data score as trusted based on a determination that the expected communication pair data score meets or exceeds a threshold; and updating the trained machine learning database with sender and recipient communication pair data corresponding to the trusted expected communication pair data score for future communication.

16. The non-transitory computer-readable medium of claim 15, wherein the method further includes:

screening for trusted expected communication data by filtering future expected communication data against the communication data filters.

17. The non-transitory computer-readable medium of claim 15, wherein the method further includes:

generating a list of untrusted senders associated with an expected communication pair data score that does not meet or exceed the threshold.

18. The non-transitory computer-readable medium of claim 17, wherein the method further includes:

analyzing the list of untrusted senders various identifying data unique to the sender;

storing the list of untrusted senders in the trained machine learning database.

19. The non-transitory computer-readable medium of claim 15, wherein generating an expected communication pair data score based on the expected communication data comprises:

analyzing the expected communication data for known sender and recipient communication pair data, communication delivery data, feedback data, and interaction data, wherein the interaction data comprises at least information corresponding to whether the recipient replied to the sender.

20. The non-transitory computer-readable medium of claim 18, the method further comprising:

determining whether the communication transmitted by the senders corresponding with the list of untrusted senders was well-received by the recipient, by analyzing recipient feedback information.

\* \* \* \* \*